May 20, 1952 G. R. SMART 2,597,539
SLIDING WINDOW STRUCTURE
Filed Dec. 20, 1945 7 Sheets-Sheet 2

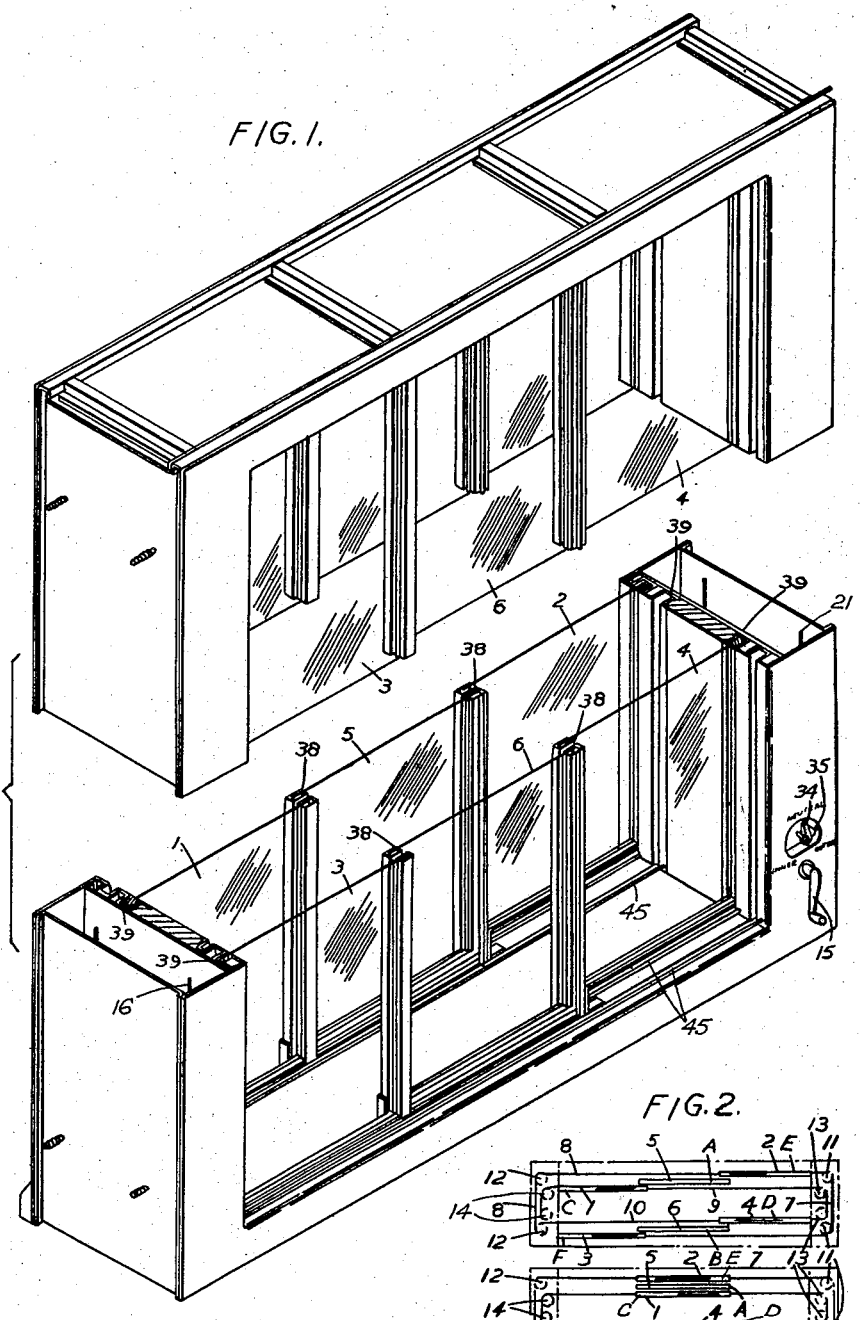

INVENTOR.
Gerald Rupert Smart
BY
ATTORNEY

May 20, 1952     G. R. SMART     2,597,539
SLIDING WINDOW STRUCTURE
Filed Dec. 20, 1945     7 Sheets-Sheet 3
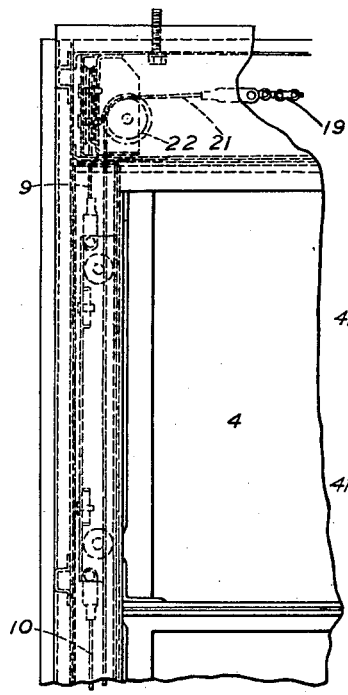
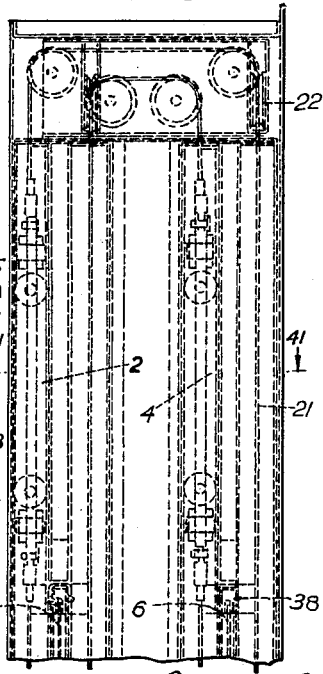
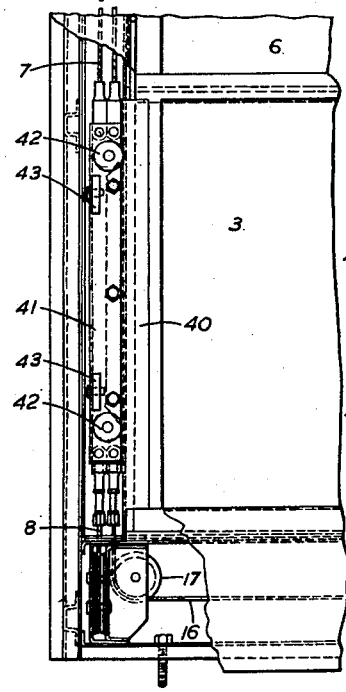
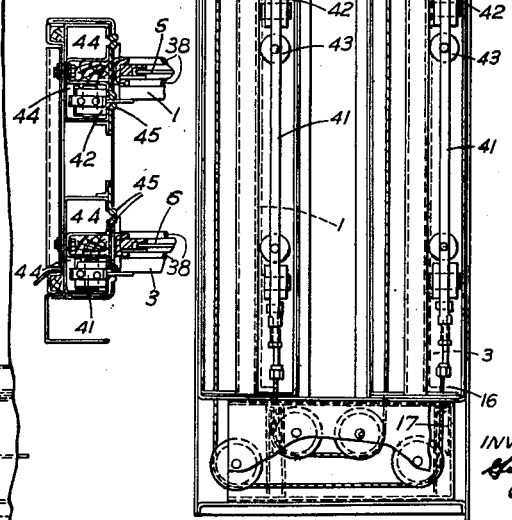
INVENTOR
BY
ATTORNEY

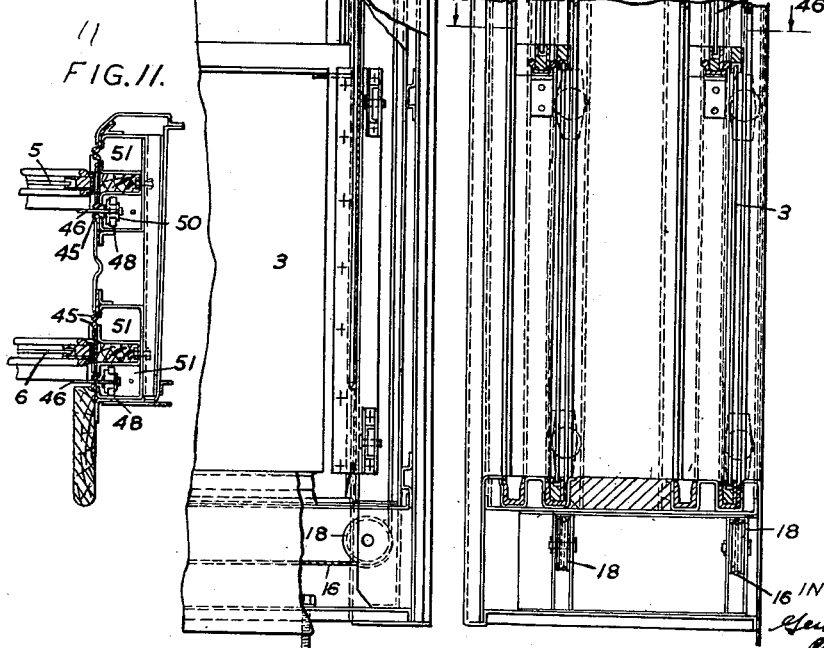

May 20, 1952 G. R. SMART 2,597,539
SLIDING WINDOW STRUCTURE
Filed Dec. 20, 1945 7 Sheets-Sheet 5
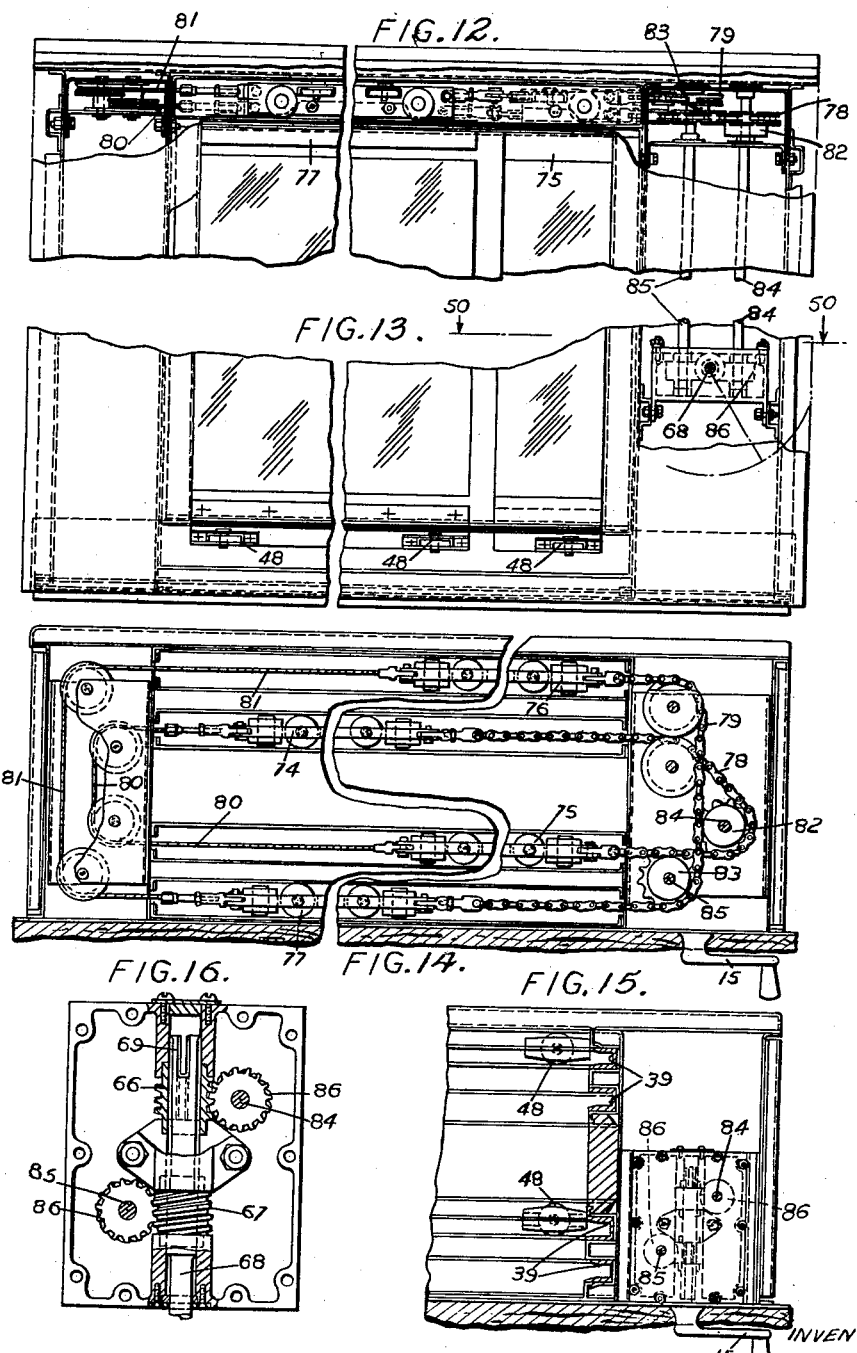
INVENTOR
Gaadd Rupert Smart
BY
ATTORNEY May 20, 1952   G. R. SMART   2,597,539
SLIDING WINDOW STRUCTURE
Filed Dec. 20, 1945   7 Sheets-Sheet 6

INVENTOR
Gerald Rupert Smart
BY
ATTORNEY

May 20, 1952  G. R. SMART  2,597,539
SLIDING WINDOW STRUCTURE
Filed Dec. 20, 1945  7 Sheets-Sheet 7
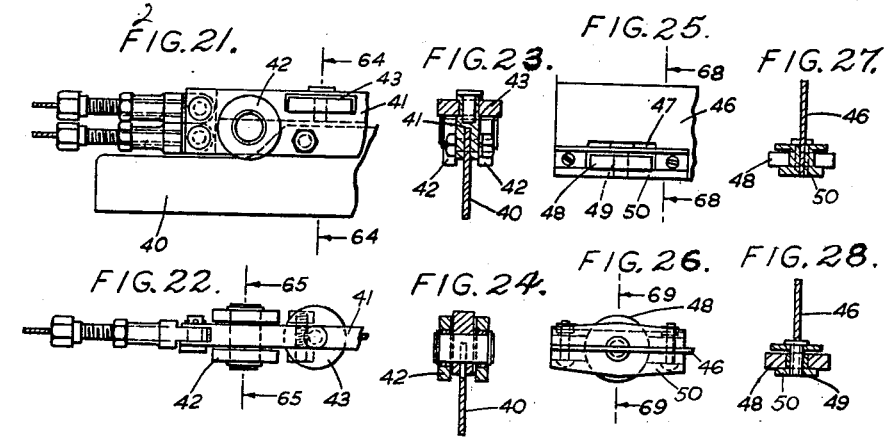
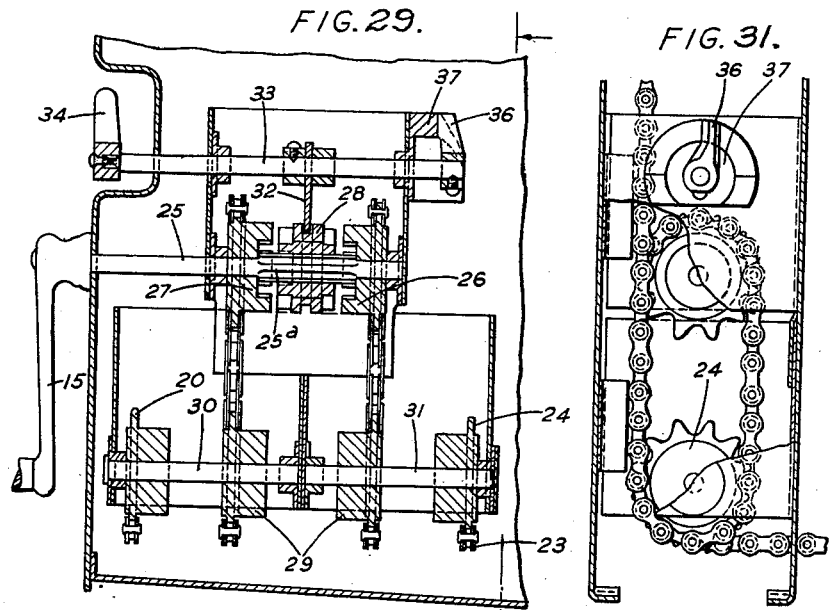
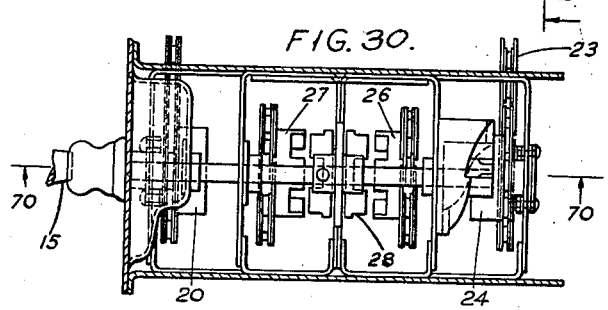
INVENTOR
Gerald Rupert Smart
BY
ATTORNEY Patented May 20, 1952

2,597,539

UNITED STATES PATENT OFFICE 2,597,539

SLIDING WINDOW STRUCTURE

Gerald Rupert Smart, Brighton, England, assignor to John Thompson Beacon Windows Limited, Wolverhampton, England Application December 20, 1945, Serial No. 636,095
In Great Britain December 27, 1944

3 Claims. (Cl. 20—52)

This invention relates to sliding windows, roofs, roof lights, ventilators, shutters, doors and the like of the kind comprising at least two sliding sashes arranged in staggered relationship in parallel or non-parallel planes, and it has for its object to provide an improved construction wherein in opening and closing said window or the like at least two sliding sashes are caused to slide simultaneously but in opposite directions.

The object of the present invention is to provide an improved arrangement of sliding window or the like of the above kind having two sections separated from each other laterally and which may be used in any required position and with the sliding sashes or the like in each section movable either horizontally, vertically or angularly.

Broadly, the present invention consists of a sliding window, roof, roof light, ventilator, shutter, door or the like, having at least two sections, each section comprising at least two sliding sashes, said sliding sashes being cross-coupled to form two pairs of movable sliding sashes, each pair consisting of a sliding sash in one section and a sliding sash in, and on the opposite side of, the other section and operating mechanism adapted to move the sliding sashes in each pair simultaneously and in opposite directions.

A window or the like according to the present invention may consist of two or more sections, each having at least two sliding sashes or the like with or without fixed sashes, panels or louvers.

In a construction according to the present invention the window will comprise two sections, an inner section and an outer section, each having two sliding sashes, with or without a fixed sash, and said sliding sashes will be so coupled that one sliding sash of the outer section will move oppositely to but simultaneously with a sliding sash on the opposite side of the inner section while the opposite couple is movable independently of the first couple by selective mechanism.

In a further embodiment the sliding sashes move in relation to fixed louvers at each end of the window frame, either two on the outside and two on the inside, or two on one side only of the window.

Many further applications of the invention are possible and so that the invention may be clearly understood and carried into effect several of said applications will now be described by way of example, by aid of the accompanying drawings, in which:

Fig. 1 is an isometric view illustrating the upper and lower halves of a double section window, each section comprising three sliding sashes;

Figs. 2 and 3 are diagrammatic views of the same in the closed and fully open positions, respectively;

Fig. 4 is a part sectional elevation illustrating the upper part of a window according to the embodiment illustrated in Figs. 2 and 3;

Fig. 5 is a plan view partly in section of Fig. 4;

Fig. 6 is a transverse section on the line 41—41 of Fig. 5;

Fig. 7 is a transverse section on the line 42—42 of Fig. 5;

Fig. 8 is a part sectional elevation of the bottom half of the window shown in Fig. 4;

Fig. 9 is a plan view, partly in section of Fig. 8;

Fig. 10 is a transverse section on the line 45—45 of Fig. 9;

Fig. 11 is a transverse section on the line 46—46 of Fig. 9;

Figs. 12 and 13 are views of the top and bottom halves of a window in part sectional elevation, but showing the major part of the operating mechanism in the top half of the window frame instead of part in the top and part in the bottom as in the preceding arrangement shown in Figs. 4 and 8;

Fig. 14 is a sectional plan view of Fig. 12 with the top section removed;

Fig. 15 is a section on the line 50—50 in Fig. 13 looking downwards in the direction of the arrows;

Fig. 16 is an enlarged view of the operating gearbox with the coverplate removed;

Fig. 21 is an elevation to an enlarged scale of one of the wheeled carriers for the window illustrated, for example in Fig. 1;

Fig. 22 is a plan view of Fig. 21;

Fig. 23 is a transverse section on the line 64—64 of Fig. 21;

Fig. 24 is a transverse section on the line 65—65 of Fig. 22;

Fig. 25 is a side elevation to an enlarged scale of one of the lateral roller guides or followers shown in Fig. 8;

Fig. 26 is a plan view of the same;

Fig. 27 is a section on the line 68—68 of Fig. 25;

Fig. 28 is a transverse section on the line 69—69 of Fig. 26;

Fig. 29 is a section on the line 70—70 of Fig. 30 which, in turn, is an enlarged plan view of the actuating mechanism shown in Fig. 9;

Fig. 31 is an end view of Fig. 29 looking in the direction of the arrows, with parts broken away.

Throughout most of the views in the drawings like references are used to indicate like parts.

The improved sliding window, roof light, shutter, ventilator and the like in all the embodiments illustrated in the accompanying drawings comprise at least two sliding sashes which are coupled together and to operating mechanism whereby the sashes in each couple are caused to move simultaneously and oppositely from a fully closed position where the sashes in each pair are at opposite ends of their frame to a fully open position where the same sashes overlap each other in the center of said frame or pass into pockets at the opposite ends of the said frame. In one arrangement one sliding sash in each pair is positively moved by the driving mechanism while the other and complementary sliding sash is coupled to the driven sash thereby to receive its motion directly from said driven sash.

The driving mechanism may conveniently consist of a driven sprocket wheel over which passes a chain forming either the whole or part of the connecting medium with the driven sash. This sprocket wheel may either be directly rotated by means of a crank handle or through the intermediary of a power or manually operated worm and wormwheel or other suitable form of gearing.

Where the window or the like has more than one section each consisting of a pair of movable sashes, the driving mechanism may include a clutch whereby the drive to each pair of sliding sashes may be selective so that any one pair of sashes may be opened and closed at a time.

The improved window of the present invention may incorporate any required number of sections and each section any desired number of sliding sashes, and in the diagrams forming part of the accompanying drawings several suitable examples are shown, also a number of shapes in which the window may be made.

Figure 2A:
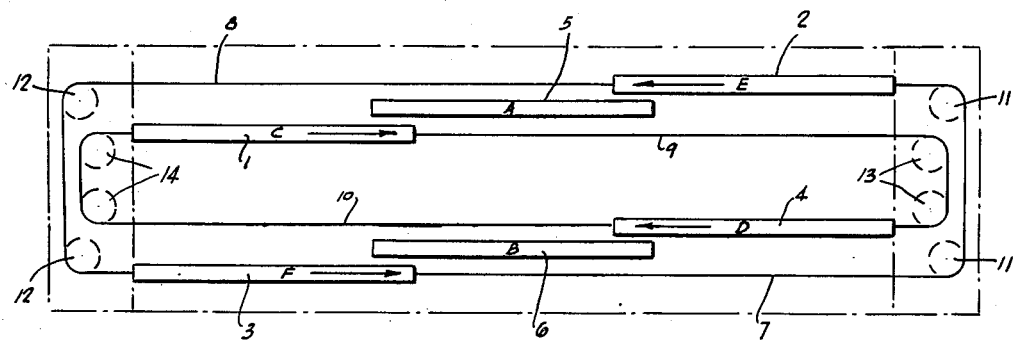
Figs. 2a and 3a are enlarged diagrammatic views of the showing in Figs. 2 and 3.
Figure 3A:
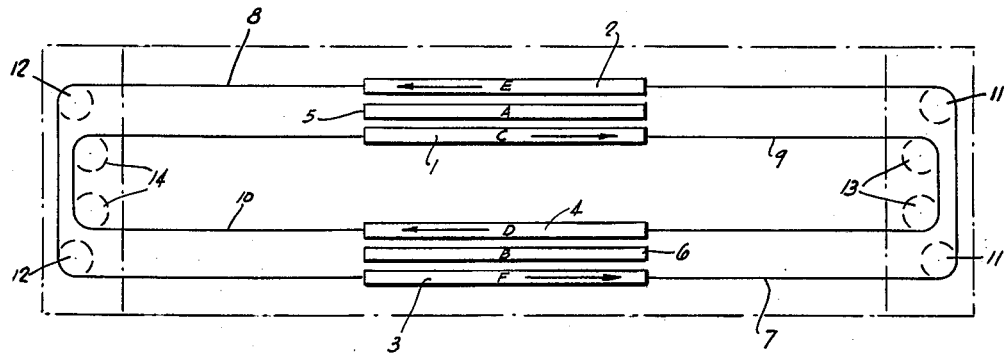
Figure 17:
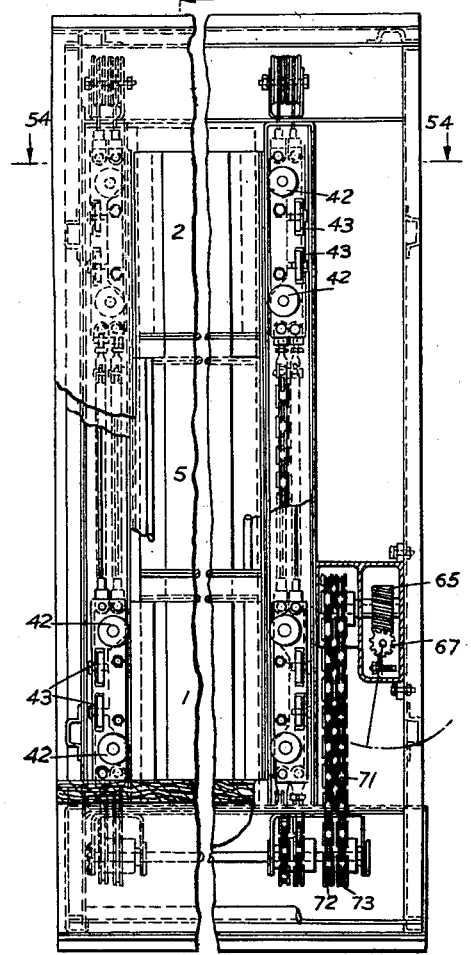
Fig. 17 is a part sectional elevation of a construction similar to that illustrated in Fig. 2, but adapted for vertical movement of the sliding sashes.
Figure 18:
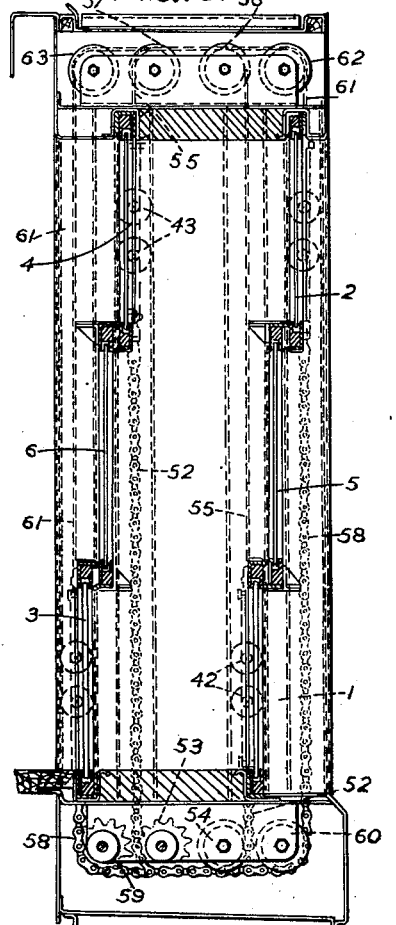
Fig. 18 is a section on the line 53—53 of Fig. 17.
Figure 19:
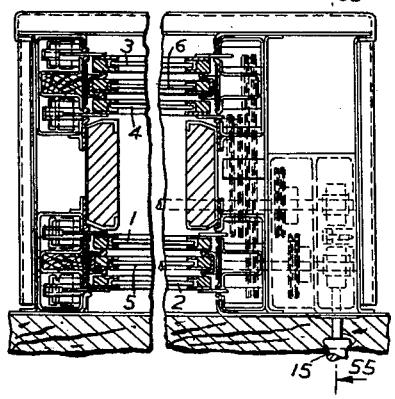
Fig. 19 is a transverse section on the line 54—54 of Fig. 17.
Figure 20:
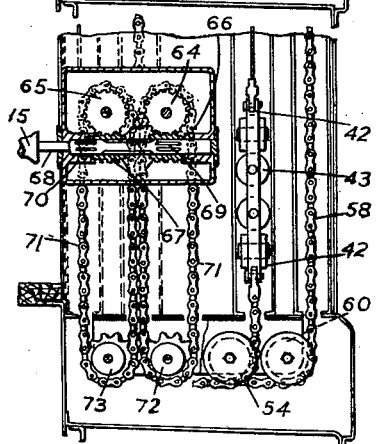
Fig. 20 is a section on the line 55—55 of Fig. 19.

In Figs. 2 and 3 the improved window is shown as incorporating two sections each containing three sliding sashes, making two central fixed sashes A and B and two pairs of coupled sliding sashes C and D and E and F.

Referring now to the constructional embodiment illustrated in Figs. 1, 2 and 3, and Figs. 4 to 11 inclusive, the window therein illustrated is a double section window in which each section comprises two movable sashes and a central fixed sash. The four movable sashes are indicated by the references 1, 2, 3 and 4, and the two fixed sashes by the references 5 and 6 in addition to the previously mentioned alphabetical characters.

In general, as will be seen most clearly in Figs. 1 to 3 the outer right-hand sash 2 is coupled to the inner left-hand sash 3, while the outer left-hand sash 1 is coupled to the inner right-hand sash 4, in the first case by a pair of horizontal cables 7 and 8 and in the other case by a pair of similarly arranged cables 9 and 10. The cable 7 is attached by one end to the right-hand end of the sash 2. It then passes around the two pulleys 11 at the right-hand side of the window frame and by its other end is attached to the right-hand end of the sash 3. The other cable 8 in the pair then proceeds from the left-hand end of the sash 3, around pulleys 12 at the left-hand side of the window frame and connects with the left-hand end of the sash 2. The cable 9 is attached by one end to the right-hand end of the sash 1. It then passes around a further pair of pulleys 13 at the right-hand side of the window frame and connects up with the right-hand end of the sash 4. The cable 10 then proceeds from the left-hand end of the sash 4, passes around a further pair of pulleys 14 at the left-hand side of the window frame and connects up with the left-hand end of the sash 1.

As a result of the above connections, sliding movement imparted to the sash 2 will be imparted simultaneously but in the opposite direction to the sash 3. Similarly, in the case of the sash 1 and its complementary sash 4. Each pair of sashes is thus movable to any position between the fully closed position shown in Fig. 2 to the fully open position shown in Fig. 3, where each pair of sashes overlaps its fixed sash 5 or 6.

In this embodiment the driven sashes are 1 and 3 and to this end they are connected for selective operation by a crank handle 15, see Figs. 1 and 8 and 9. The connections comprise, in the case of sash 3, a cable 16 which is attached to the left-hand end of the light, and passes over a pulley 17, downwards within the left-hand stile of the window, around a further pulley 18, along and within the sill to the right-hand lower end of the window when it connects with a length of chain 19 that passes around a sprocket wheel 20 forming a part of the driving mechanism. The upper end of this chain is connected to the right-hand end of the sash 3, by a further length of cable 21 which passes over a further pulley 22 to turn the cable from the vertical to the horizontal. The driving connection between the sash 1 and the driving mechanism is identical with but separate from that described in connection with sash 3 in that its driving chain 23 passes over a separate sprocket wheel 24, see Figs. 29 and 30, which is driven independently of the other sprocket wheel 20 by means permitting either wheel to be selected for operation at will.

The means for this purpose, as used in the embodiment illustrated in Figs. 8 and 9, is best to be seen by reference to Figs. 29, 30 and 31, and comprises a lay shaft 25 on which are mounted the elements of a double dog clutch consisting of right and left-hand clutch members 26 and 27 mounted free on said shaft and an intermediate dog 28 which is mounted between the two clutch members and on a splined portion 25a of the shaft so as to be rotated thereby but free to have endwise sliding movement into and out of engagement with the teeth of each clutch member alternatively. This lay shaft 25 is driven by the aforesaid crank handle 15.

The clutch members are provided with teeth to form sprocket wheels which connect by short continuous chains with further sprocket wheels 29 that are mounted on the two portions 30 and 31 of a divided shaft, one on each portion, the portion 30 carrying the sprocket wheel 20 and the other portion 31 the sprocket wheel 24. As a result the engagement of clutch member 26 by the center dog 28 and rotation of handle 15 will rotate sprocket wheel 24 and so impart opposite movements to the connected sashes 1 and 4 while similar rotation of the sprocket wheel 20, through selective operation of the dog 28, will produce separate operation of the sashes 2 and 3.

The striking gear for sliding the dog 28 along the splined section 25a of the shaft 25 comprises a striker arm 32 the lower end of which engages the usual circumferential groove in the flange of the dog while the upper end is mounted upon so as to swing about a striker shaft 33 in a fixed plane which shaft is given its endwise movement by partially rotating the shaft by means of a finger piece 34 that is movable in relation to an indicator 35, see Fig. 1. This causes a follower 36, mounted upon the opposite end of the shaft to ride over the helical surface of a cam 37 and so effect endwise displacement of the shaft 33 in either direction according to the direction in which the finger piece 34 is turned.

The window of the embodiment just described is rendered draftproof by affixing weathering strips or rubber beading as at 38 between the vertical contacting surfaces of the sash frames and providing vertical recesses 39 in the stiles of the window to receive the vertical end of each movable sash when closed, said recesses being lined with a suitably yielding material.

The supporting and guiding means for each movable sash is illustrated in Figs. 4 to 11 and to a larger scale in Figs. 21 to 28 and comprises for the upper supports a plate 40 adapted to be affixed to the horizontal side of the sash frame. This plate carries a saddle 41 in the form of a metal bar forming a mounting for two pairs of vertical supporting wheels 42 having bearings at each end of the saddle for supporting the weight of a sash and a horizontal or transverse wheel 43 for maintaining the sash against lateral displacement while to each end of said saddle are affixed the ends of the operating and connecting cables. In some cases, such as curved windows, the transverse wheels may be arranged to lead the vertical wheels in both directions of movement of the sash or pane.

As shown for example, in Figs. 6 and 7, each saddle with its supporting and guiding wheels is mounted to run within box-like guide channels 44 in the head of the main window frame so as to be completely enclosed therein while each depending plate 40 extends through a narrow slot in the bottom of each channel 44, said slots being edged, for preference, with resilient beading strips 45 which upon the passing of the depending plate automatically control and close the aperture in each channel.

The guiding means for the lower ends of the sashes are illustrated in Figs. 8 and 10 and Figs. 25 to 28 and comprise a further plate 46 which is slotted as at 47 near each end for the reception of lateral guiding wheels 48. Where desired these lower guiding means may also include vertical supporting wheels similar to those used at the top of each sash. Each wheel is mounted to revolve freely on a vertical pivot pin 49 the mounting for which is made from a bar of double channel section 50 one length of which is affixed at each end of the plate 46, and drilled and bushed to provide a bearing for the pivot pin 49.

The above guiding means, similarly to those for the upper ends of the sashes, run within box-like guide channels 51 in the sill portion of the window frame.

In Figs. 17 to 20 I have shown a construction whereby the arrangement of Figs. 1 to 3 and 4 and 5 may be adapted for a vertical window. This is a window in which the movable sashes are moved vertically instead of horizontally. In this embodiment sashes 1 and 4 are connected at their lower edges by a chain 52 which passes around a sprocket wheel 53 and a pulley 54 disposed within the sill of the window frame and on their opposite sides by a cable 55 which passes over pulleys 56 and 57, in the top of the window frame. The other movable sashes 2 and 3 are connected at their lower ends by a chain 58 which passes over a sprocket wheel 59 and a pulley 60 in the sill of the window frame. The opposite ends of these sashes are connected by a cable 61 which passes around pulleys 62 and 63 in the top of the window frame.

The coupled sashes are adapted to be driven independently through their respective sprocket wheels 53 and 59 by worm gearing operated by the handle 15. The worm wheels are indicated respectively at 64 and 65 and their worms at 66 and 67. These worms in turn are mounted upon a shaft 68 which is rotatable by the handle 15 and mounted to have end movement so that by pulling out the handle 15 the shaft assumes the position shown in Fig. 20 with a splined portion 69 in driving engagement with the worm 66. A further splined portion 70 is then out of driving engagement with the other worm 67. By pushing in the handle 15 this further splined portion 70 is moved into driving engagement with the worm 67 while the other splined portion is moved out of driving engagement with the worm 66 which in consequence is free on the said shaft. In the first and illustrated position of the shaft 68 the sashes 1 and 4 are moved by the rotation of the handle 15 while the other coupled pair of sashes 2 and 3 remain stationary, but in the second or inward position of the shaft this latter pair of sashes is moved while the first pair remains stationary. The driving connections between the worm wheels 64 and 65 and the sprocket wheels 53 and 59 each consist of a continuous chain 71 which passes around sprocket wheels associated with the worm wheels and further sprocket wheels 72 and 73 which are mounted on the same shafts as the sprocket wheels 53 and 59. The sprocket wheels 53 and 59 with the chains 52 and 58 and the drive therefor, also the cable couplings for both pairs of sashes are duplicated for the opposite side of each sash as will clearly be seen in Fig. 17, thus providing a balanced support for each movable sash.

In Figs. 12 to 16 I have illustrated a window similar to that illustrated in Figs. 4 to 8, but with the fixed sashes omitted for the sake of clearness, modified to permit the couplings for all the sashes to be embodied wholly within the top half of the window frame for which purpose they are arranged horizontal.

In this embodiment the two inner sashes represented by their carriers 74 and 75 are coupled together to form one coupled pair and the two outer sashes similarly represented by their carriers 76 and 77 to form the other coupled pair. In both cases the couplings each consist, on one side, of a chain and, on the opposite side, of a length of cable. In the drawing the length of chain for the two inner sashes is indicated at 78 and that for the two outer sashes by the reference 79 while the respective cables are indicated at 80 and 81. The driving means comprise two horizontal sprocket wheels, that for the chain 78 being indicated at 82 and that for the chain 79 at 83. These sprocket wheels are mounted upon vertical shafts 84 and 85 respectively and these are driven by worm and wormwheel in the same manner as in the preceding example, said worm-wheels being each indicated by the reference 86.

As will be seen from the drawings the sashes in a window according to the present invention may be cross-connected in any suitable manner provided that said window includes at least two pairs which when the operating gear is worked will move simultaneously but oppositely to each other. Also, where required, pipes may be incorporated in the window frame for the introducing of hot air between the sections of sliding sashes.

It will, of course, be understood that in any of the examples illustrated the connecting means may consist wholly of lengths of chain. Further, the supporting means may consist of or comprise ball and/or roller bearings.

It is also to be understood that a sliding window or the like may include further refinements such as a slipping clutch in the operating means to prevent over-run, window boards and the like. The sliding sashes for the windows can be fitted with any type of glazing. For example, each sash may comprise two panes of glass spaced apart to leave a narrow space into which chemically treated air may be introduced.

Where the windows are used in inaccessible positions operation may be by remote control and actuation effected by hand, by electric motor, or by means of a fluid under pressure.

It will be seen that a window or the like according to the present invention besides being air-baffling is also sound reducing in consequence of the alternate opening of the sliding sashes.

Although in all the examples illustrated the sliding sashes are shown as being parallel to each other, they may be inclined in relation to each other, preferably in the direction of their movement. This will produce a converging or diverging effect on the air currents thus permitting the regulation of their velocities.

The movement of the free sliding sashes or panels can be governed to cover safety precautions in dangerous situations.

Although I have illustrated in the drawings planar configurations for the sections and the sliding sashes, it is within the province of this invention to provide an arrangement wherein the same are curved or bowed with the cooperating supporting and guiding means associated with the opposing ends of the sliding sashes being of bowed or curved configuration for movement in analogous shaped channels formed in the frame. Although I have shown structures with double sections, it is within the province of this invention to provide triple-section sliding sash structures for window, roof light, door, or like apertures.

Having now particularly described and ascertained the nature of my said invention and in what manner the same is to be performed, I declare that what I claim is:

1. In a sliding sash structure of the class described, at least four movable sashes arranged in pairs in two different but parallel planes, means for cross-coupling said sashes to form at least two pairs thereof, each pair consisting of a sash in one plane and a sash transversely, diametrically and equidistantly displaced from the first sash in the adjoining plane, means connecting opposite ends of each said sash pair to form a closed circuit coupling therefor, mechanism operatively connected with said coupling means for moving the sashes in each pair of sashes simultaneously and oppositely to each other out of and into closed position.

2. A structure in accordance with claim 1, wherein the means for displacing the sashes of the respective pairs is operatively associated with the connecting means for each pair of sashes and selectively actuatable for displacing one pair of coupled sashes independently of the other pairs of coupled sashes.

3. A structure in accordance with claim 1, wherein, in the fully closed position each pair has two sliding sashes and a central fixed sash intermediate the same, and wherein in the fully open position all four movable sashes assume a position parallel to and in alignment with the central fixed sashes.

GERALD RUPERT SMART.

REFERENCES CITED

The following references are of record in the file of this patent:

UNITED STATES PATENTS

| Number | Name | Date |
|---|---|---|
| 343,781 | Tierney | June 15, 1886 |
| 644,949 | Spinks | Mar. 6, 1900 |
| 982,487 | Elmer, Jr. | Jan. 24, 1911 |
| 1,031,124 | Kane | July 2, 1912 |
| 1,136,784 | Fair | Apr. 20, 1915 |
| 1,777,604 | Cruickshank | Oct. 7, 1930 |
| 2,059,436 | Campbell | Nov. 3, 1936 |
| 2,260,013 | Elvers | Oct. 21, 1941 |

FOREIGN PATENTS

| Number | Country | Date |
|---|---|---|
| 15,191 | Great Britain | 1895 |
| 115,875 | Australia | 1942 |
| 149,869 | Austria | 1937 |
| 495,155 | Great Britain | 1938 |
| 710,296 | France | 1931 |
| 884,509 | France | 1943 |